United States Patent
Lee et al.

(10) Patent No.: US 7,864,982 B2
(45) Date of Patent: Jan. 4, 2011

(54) DISPLACEMENT AND TILT DETECTION METHOD FOR A PORTABLE AUTONOMOUS DEVICE HAVING AN INTEGRATED IMAGE SENSOR AND A DEVICE THEREFOR

(75) Inventors: Jonggoo Lee, Goyang-Si (KR); Eli Ben-Ami, Herzlia (IL); Israel Disatnik, Bat-Hefer (IL); Natan Linder, Motza Illit (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1178 days.

(21) Appl. No.: 11/503,193

(22) Filed: Aug. 14, 2006

(65) Prior Publication Data

US 2007/0041616 A1 Feb. 22, 2007

Related U.S. Application Data

(60) Provisional application No. 60/709,794, filed on Aug. 22, 2005.

(51) Int. Cl.
G06K 9/00 (2006.01)
(52) U.S. Cl. .................................... 382/107
(58) Field of Classification Search .................. 382/107
See application file for complete search history.

(56) References Cited

U.S. PATENT DOCUMENTS

| | | | |
|---|---|---|---|
| 6,594,397 B1* | 7/2003 | Hu | 382/236 |
| 6,993,199 B2* | 1/2006 | Chebil | 382/240 |
| 2003/0083850 A1* | 5/2003 | Schmidt et al. | 702/189 |
| 2003/0231856 A1* | 12/2003 | Ikeda | 386/46 |
| 2005/0216867 A1* | 9/2005 | Marvit et al. | 715/863 |
| 2005/0276333 A1* | 12/2005 | Park | 375/240.18 |
| 2005/0285947 A1* | 12/2005 | Grindstaff et al. | 348/208.4 |
| 2006/0067589 A1* | 3/2006 | Perlmutter et al. | 382/276 |
| 2006/0177103 A1* | 8/2006 | Hildreth | 382/107 |
| 2006/0190750 A1* | 8/2006 | Maggi et al. | 713/320 |
| 2006/0285587 A1* | 12/2006 | Luo et al. | 375/240.2 |
| 2007/0095588 A1* | 5/2007 | Mattes et al. | 180/197 |

FOREIGN PATENT DOCUMENTS

JP 2003-008693 1/2003

(Continued)

OTHER PUBLICATIONS

Official Action Dated Jul. 22, 2009 From the US Patent and Trademark Office Re.: U.S. Appl. No. 11/503,119.

Primary Examiner—John B Strege
Assistant Examiner—Nirav G Patel

(57) ABSTRACT

A displacement detection method for a portable autonomous device having an integrated image sensor. The method comprises several steps. In the first step a current digital image is received from the image sensor; the current digital image depicting a background scene. Then, the position of a first area within the current digital image is chosen. Afterwards, a later digital image is received from the image sensor depicting an overlapping portion of the background scene. Then, the position of a second area matching to the first area within the later digital image is identified. After a match has been identified, the first and second areas depict approximately the same portion of the background scene. Then, a current motion vector of the portable autonomous device is calculated, according to a displacement between the first area and the second area.

10 Claims, 12 Drawing Sheets

FOREIGN PATENT DOCUMENTS

| | | |
|---|---|---|
| JP | 2004-120514 | 4/2004 |
| KR | 10-2008-7004240 | 4/2004 |
| KR | 10-2004-0100122 | 12/2004 |
| KR | 10-2005-0013362 | 2/2005 |
| WO | WO 96/39677 | 12/1996 |
| WO | WO2004041611 | * 5/2004 |

* cited by examiner

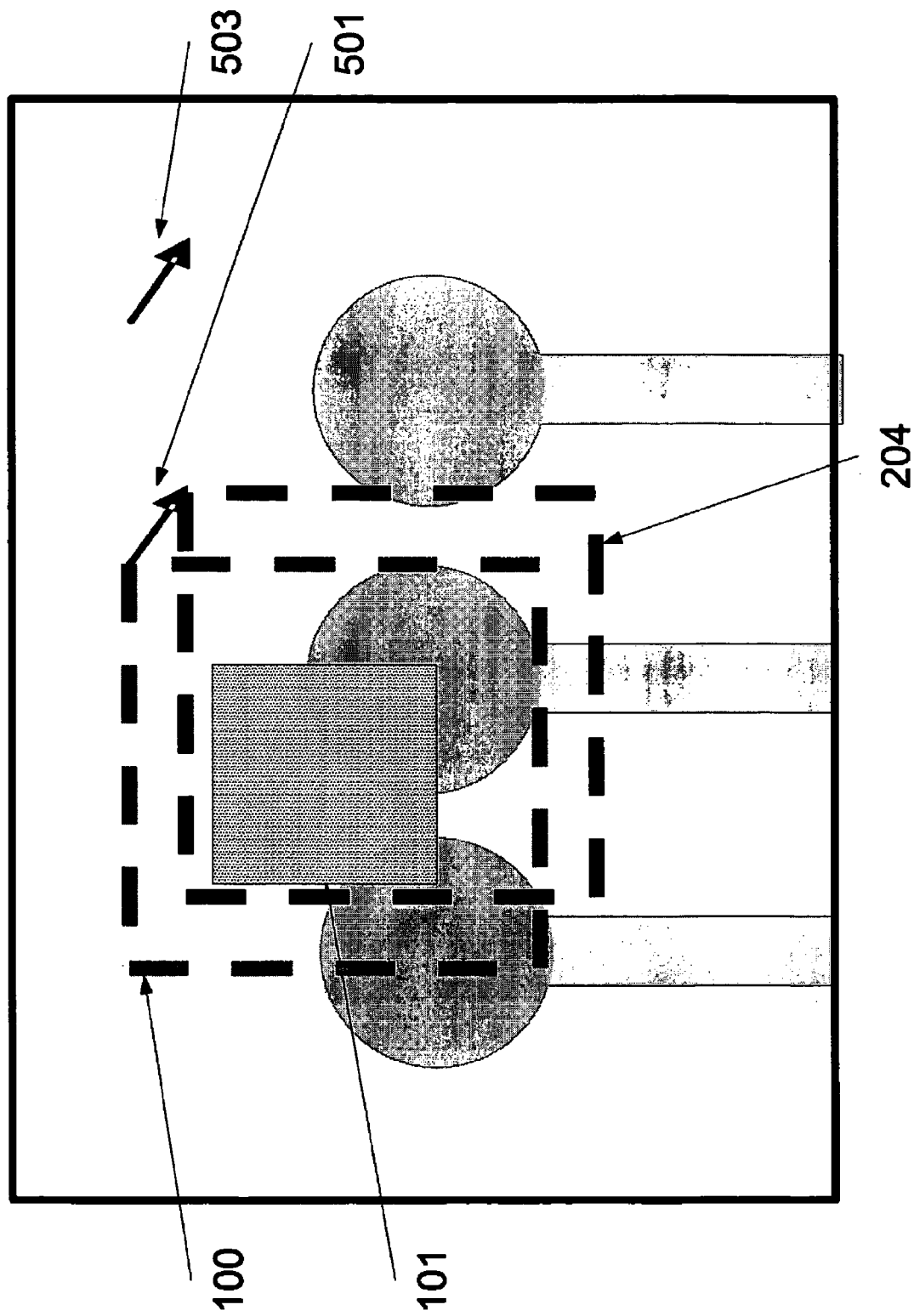

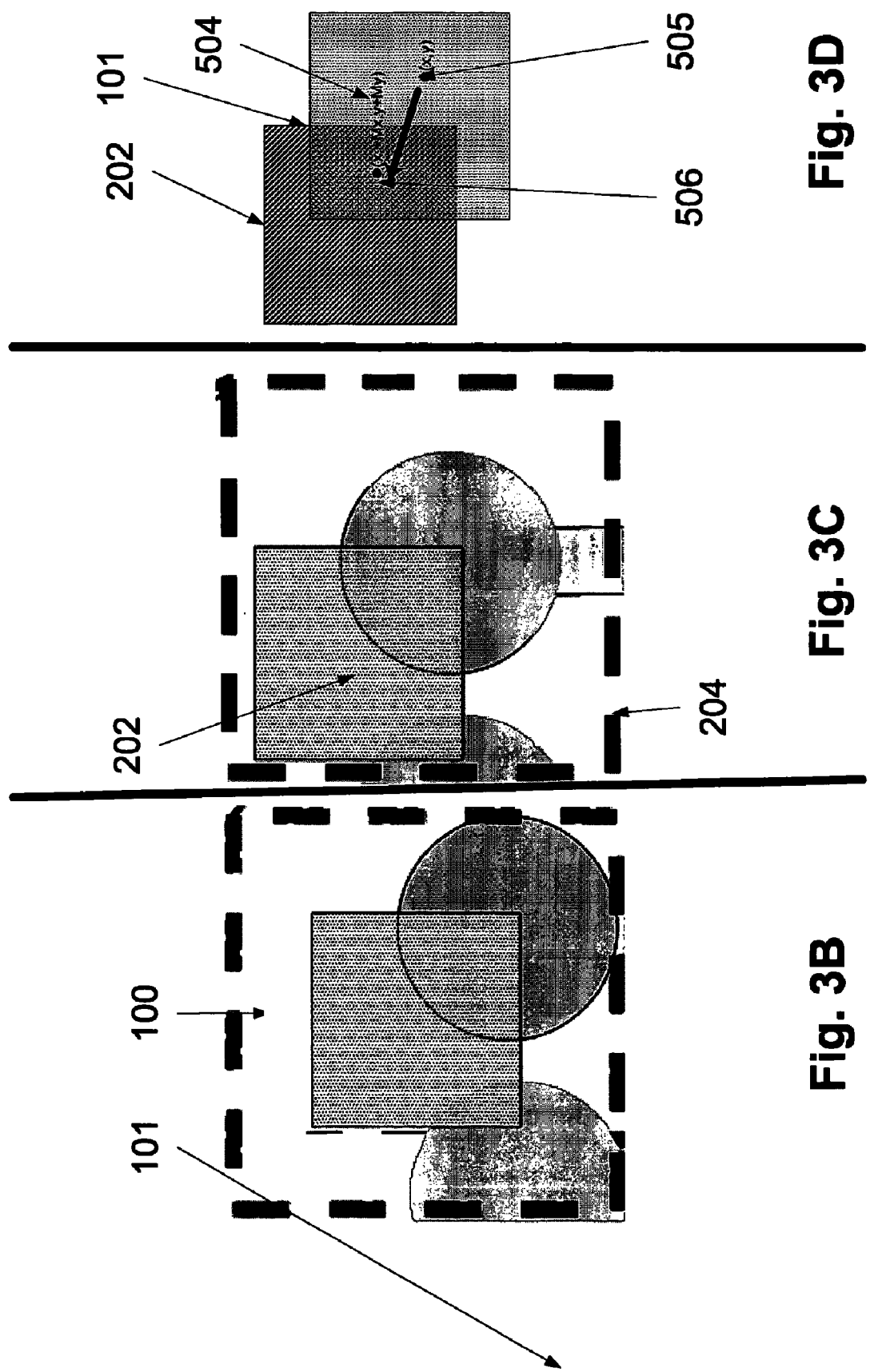

US 7,864,982 B2

DISPLACEMENT AND TILT DETECTION METHOD FOR A PORTABLE AUTONOMOUS DEVICE HAVING AN INTEGRATED IMAGE SENSOR AND A DEVICE THEREFOR

RELATED APPLICATIONS

The present Application claims priority from Provisional U.S. Patent Application No. 60/709,794, filed on Aug. 22, 2005, the contents of which are hereby incorporated in full by reference.

FIELD AND BACKGROUND OF THE INVENTION

The present invention relates to a method and device for allowing users to input directional instructions to an application of a portable autonomous device and, more particularly but not exclusively, to a method and device for allowing users to input directional instructions to an application of a portable autonomous device with limited computational abilities, using image processing.

The rapid miniaturization of complex electronic circuits and the emergence of high-resolution displays have vastly increased the number and variety of portable processor-based devices. Such devices include handheld computers, mobile telephones, pagers and other portable communication and computing solutions. Moreover, processing power, data storage capability, communication speed, and battery life of portable autonomous devices continue to develop at an accelerated pace.

Each one of the aforementioned portable autonomous devices usually integrates a man machine interface (MMI) that allows users to control its functioning. However, the MMI has to be adjusted to the small size of the portable autonomous device. The traditional MMI is a minimized keyboard or a keypad which allows users to input data having textual representation such as a telephone number, a contact name, word processor content, etc. The minimized keyboard or keypad may also be used as a pointing device.

Some portable autonomous devices integrate designated pointing devices in addition to their textual input devices. For example, recently developed mobile phones usually comprise a small joystick or a roller which enables users to operate the portable autonomous devices. Users may control the portable autonomous devices using the pointing devices by making selections on display screens which are connected to the devices. For example, using pointing devices, users can scroll the viewing areas by selecting the vertical or horizontal scroll bars on the display screens.

Another commonly used MMI is the touch screen. Personal digital assistants (PDAs), for example, usually integrate such touch screens and pen-like pointing device which are often stored next to or on the PDAs. In use, a pen-like pointing device is applied to a display area on a PDA to enable a user to make choices and interact with a PDA portable autonomous device. High resolution LCD touch screens may be used in mobile phones and portable devices. The disadvantages of using touch screens are their high price and limited transparency which reduces the picture quality, particularly of modern, high resolution LCD displays.

The rapid miniaturization and cost reduction of complex electronic components has recently led to the integration of image sensors into processor-based portable autonomous devices. PDAs, mobile phones, and laptops integrate cameras which are used to capture still and video images. This has enhanced the marketing potential of mobile phone handsets.

The integration of image sensors additionally allows users to interface with the portable processor-based devices. For example, it is known that outputs of image sensors may be used to calculate the displacement of objects. However, the known methods have several limitations as they rely on certain criteria to track the scene and they may not be reliable, scalable and robust. These limitations thus prevent the processor-based devices from performing certain functions using the displacement detection process. Moreover, the aforementioned methods do not facilitate an efficient utilization in portable autonomous devices with limited computational resources.

There is thus a widely recognized need for, and it would be highly advantageous to have, a portable processor-based device that allows users to input directional instructions, devoid of the above limitations

SUMMARY OF THE INVENTION

According to one aspect of the present invention there is provided a displacement detection method for a portable autonomous device having an integrated image sensor. The method comprises several step: a) receiving a current digital image from the image sensor, the current digital image depicting a background scene, b) choosing the position of a first area within the current digital image, c) receiving a later digital image from the image sensor depicting an overlapping portion of the background scene, d) identifying the position of a second area matching the first area within the later digital image, the matching being such that the first and second areas depict approximately the same portion of the background scene, and e) calculating a current motion vector of the portable autonomous device according to a displacement between the first area and the second area.

Preferably, the displacement detection method further comprises a step (f) of repeating steps c), d), and e).

Preferably, the first area is a quadrilateral area concentric to the first current digital image.

Preferably, the positioning of the first area divides the first current digital image to a margin area and a main area.

Preferably, the choosing of step b) is done according to the contrast level of potential first areas in the first current digital image.

Preferably, the displacement detection method further comprises a step between the step (a) and the step (b) of adjusting the brightness level of pixels of the current digital image according to its position.

Preferably, the displacement detection method further comprises steps before the step (a) of enabling a portable autonomous device operator to have the ability to input a sensitivity factor, and to adjust the motion vector according to the sensitivity factor.

Preferably, the identifying of step (d) is performed according to the following steps: i) separately evaluating a distortion measure of each one of area candidates according to differences in representational information from the first area, and ii) choosing one of the area candidates as a matching area, the chosen matching area candidate having the lowest distortion measure.

More preferably, the displacement detection method further comprises a step between step (i) and step (ii) of evaluating a quality level of the motion vector, the quality level determined according to the distortion measures.

More preferably, the displacement detection method further comprises a step of indicating the current quality level of the motion vector.

More preferably, the displacement detection method further comprises a step of storing the motion vector as a previous motion vector, wherein the calculating of step (e) is performed according to the following steps: i) if the current quality level does not exceed a predefined threshold, substituting the previous motion vector as the outcome, and ii) if the current quality level does exceed the predefined threshold, calculating the current motion vector.

More preferably, the evaluating of step (i) is halted if the current distortion measure is higher than a previously calculated distortion measure.

More preferably, the first area comprises regions.

More preferably, during the choosing of step (ii) the regions are probed in a certain order, the certain order determined according to the variety of the representational information of pixels of each one of the regions.

More preferably, during step (ii) the matching area candidates are chosen in a predefined order, wherein the predefined order is arranged according to the positional coordinates of the matching area candidates on the later digital image.

Preferably, the choosing of step (b) is performed according to the following steps: i) dividing a portion within the current digital image into regions, ii) separately identifying a regional pivot within each one of the regions, and
  iii) choosing the regional pivots as the first area.

More preferably, the portion is a quadrilateral area which is smaller than the current digital image, the center of the quadrilateral area being in the center of the current digital image.

More preferably, the dividing of step (i) divides the quadrilateral area into regions of equal size and shape.

More preferably, the identifying of step ii) is performed according to the following steps: a) for each region of the regions, separately evaluating a uniformity level for each one of potential regional pivots, the uniformity level reflecting the variety of representational information of related pixels, and b) for each region of the regions, separately choosing one of the potential regional pivots having the lowest uniformity level.

More preferably, the evaluating is performed by multiplying the representational information of pixels of the related regional pivot and an encircling strip of pixels by a constant multiplicative factor of a set of constant multiplicative factors and summing the products, whereby the uniformity level may be determined according to the proximity of the sum of the values of all the products to zero.

Preferably, the displacement detection method further comprises, in between the step (d) and the step (e), performing steps (a) to (d) using an additional stream of sequential digital images from an additional image sensor to generate an additional identification, and where the step (e) is performed according to the following steps: i) calculating the motion vector according the identification, ii) calculating an additional motion vector according the additional identification, and iii) outputting a spatial motion vector for the use of at least one application of the portable autonomous device according to the additional motion vector and the motion vector.

More preferably, the displacement detection method further comprises a step (e1) between step (e) and (f) of storing the later digital image as a first current digital image.

Preferably, the current and current digital images are captured during the tilting of the portable autonomous device.

Preferably, the displacement detection method further comprises a step of using the motion vector as an indication for taking a snapshot.

According to one aspect of the present invention there is provided a portable autonomous device having integrated image sensors. Each of the image sensors enables users to generate a current motion vector of displacement of the portable autonomous device against a background. The portable autonomous device comprises an image input device having a connection to the at least one integrated image sensor. The image input device being adapted to receive a reference frame and a sample frame from current digital images having background representational information from the at least one image sensor. The device further comprises a matching area module adapted to choose the position of a reference area within the boundaries of the reference frame and a matching area within the boundaries of the sample frame. The device further comprises a displacement detection module adapted to generate the current motion vector of the portable autonomous device based upon the relative positions of the reference area and the matching area. The device further comprises a display device adapted to generate a display according to the current motion vector.

Preferably, the matching area module is adapted to choose the position of a reference area according to the non-uniformity level of a number of potential first areas, the non-uniformity level is a derivative of the uniformity of values of a respective potential first area's pixels.

Preferably, the at least one image sensor comprises one of the following groups: a complementary metal oxide semiconductor (CMOS) sensor and a charged coupled portable autonomous device (CCD) sensor.

Preferably, the portable autonomous device is one of the following groups: a mobile handset, a handheld device, and a processor-based multifunctional portable autonomous device.

Preferably, the image input device has a connection to two or more integrated image sensors, the displacement detection module being adapted to generate a spatial motion vector that represents the shifting of the portable autonomous device in a three dimensional space according to two or more of the current motion vectors.

Preferably, the display device is adapted to display hierarchical menus via applications, and wherein the current motion vector is usable by the applications for navigation through the hierarchical menus.

Preferably, the display device is adapted to display a cursor, wherein the current motion vector is used to transmit navigational instructions for the cursor.

Preferably, the display device is adapted to display a telephone dial, wherein the current motion vector is used to transmit operational instructions for the telephone dial.

Preferably, the portable autonomous device further comprises a snapshot module, wherein the current motion vector is used to transmit operational instructions for the snapshot module.

More preferably, the snapshot module is configured for taking the snapshot when the motion detection signal indicates that no motion is detected by the motion detection module for a predefined amount of time.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and device of the present invention involves performing or completing certain selected tasks or steps manually, automatically, or a combination thereof. Moreover, according to actual instrumentation and equipment of preferred embodiments of the method and device of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and device of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3A is a reference frame and a sample frame which are captured by a portable autonomous device in a certain surrounding area;

FIG. 3B is a portion of the surrounding area which is captured within the reference frame of FIG. 3A;

FIG. 3C is a portion of the surrounding area which is captured within the sample frame of FIG. 3A;

FIG. 3D is a schematic illustration of the deviation between the position of the quadrilateral reference area and the chosen matching area candidate of FIG. 3A;

DESCRIPTION OF THE PREFERRED EMBODIMENTS

Figure 1:
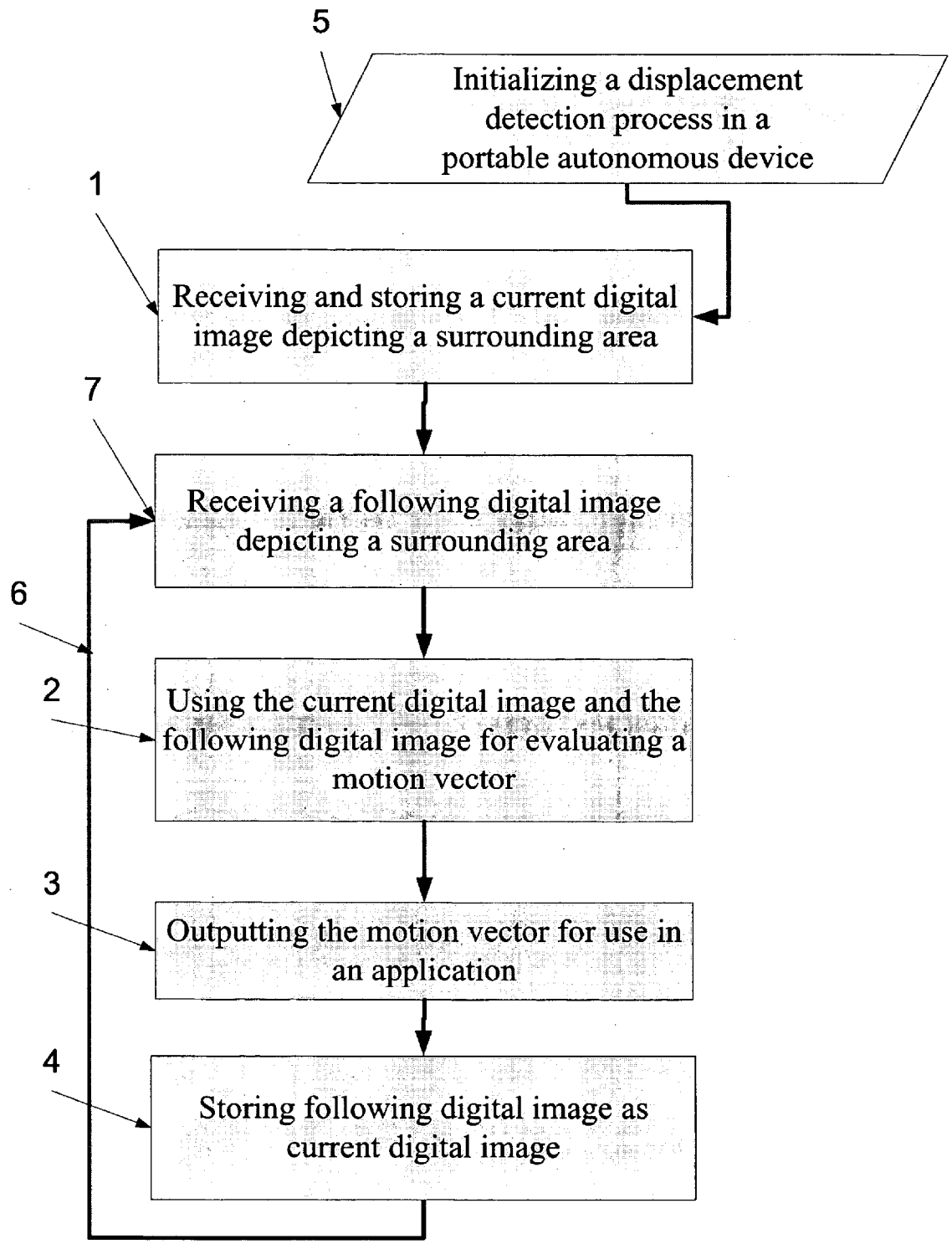
FIG. 1 is a simplified flowchart diagram of a method for object displacement detection, according to a preferred embodiment of the present invention.

The present embodiments comprise a device and a method for allowing a user to input directional instructions to applications of a portable autonomous device by displacing the device and, more particularly but not exclusively, to a device and a method for using digital images which are received in order to input directional instructions to a device with limited computational resources. More generally, the present embodiments relate to the generation of a motion vector representative of displacement of the device, from digital images, which vector can then be provided to an operating system or to applications on the device.

The principles and operation of an apparatus and method according to the present invention may be better understood with reference to the drawings and accompanying description. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

One embodiment of the present invention is a method for generating directional instructions based on motion information of a portable autonomous device that integrates an image sensor. The method comprises several steps. During the first step, a current digital image is received in real time from an image sensor. The digital images comprise pixels, each one of the pixels comprising representational information. After the current digital image has been received, the position of a reference area is chosen within the current digital image. Preferably the reference area is representative of image background. During the following step, an additional current digital image is received. Then, a position of a respective matching area within the additional digital image is identified. The reference area and matching area have respective pixels with similar representational information. After the reference area and matching area have been identified, a motion vector for the use of one or more applications of the portable autonomous device is calculated according to the change in the position of the reference area relative to the matching area, as described below. This process is cyclic and may be used to output the current motion vector of a certain portable autonomous device at any given moment, as described below.

In another embodiment of the present invention there is provided a portable autonomous device having an image sensor for enabling users to input directional instructions. The portable autonomous device comprises an image input device having a connection to an image sensor. The image input device receives from the image sensor the current and a following frame. The current and following digital images are used as the basis and the reference for motion detection by other modules of the portable autonomous device. The portable autonomous device further comprises a matching module that chooses the position of a reference area within the boundaries of the current reference frame. The matching module is then used to locate the reference area within the boundaries of the following frame that is to match with the reference area in the following frame. A motion vector may then be generated based on displacement or tilt between the two frames. A module for displacement and tilting may generate such a motion vector of the portable autonomous device. It should be noted that for the sake of conciseness the term 'displacement' is used alone hereinafter but tilting is also to be understood *mutatis mutandis*. The motion vector is generated based upon the position of the reference area and the matched area.

A portable autonomous device may be understood as any portable processor-based device, inter alia, a mobile phone, a personal digital assistant (PDA), or any other handheld device which integrates a camera or like imaging device.

Reference is now made to FIG. 1, which is a flowchart that illustrates a method for allowing a user to input directional instructions to a portable autonomous device based on its displacement, according to a preferred embodiment of the present invention. FIG. 1 depicts an iterative four-step displacement detection process which is used to output the real time motion vector of a certain portable autonomous device.

It should be noted that the motion vector can be a result of tilting or displacing the device. Since tilting combines non-linear changes in the perspective of the device, the complexity of the change which is caused by it is theoretically higher than the complexity of the change which is caused by a linear displacement. However, when using some of the embodiments which are described hereinafter, the complexity differences are negligible.

The depicted displacement detection process may be implemented in various portable autonomous devices that integrate one or more image sensors. Preferably, the displacement detection process is integrated via an MMI for portable autonomous devices that already integrate image sensors for other uses.

In one embodiment of the present invention the user may push a designated button or other MMI control in order to initiate the displacement detection process 5. The initiation activates the integrated image sensor. The computing unit of the portable autonomous device receives digital images in real time that depict a captured portion of the surrounding area. It should be noted that each one of the received digital images is probed separately, as described below. During step 1, a first digital image is received and stored as a current digital image. During the following step, as shown at 7, a consecutive digital image is stored as the following digital image. During step 2, the current digital image and following digital image are used for calculating the motion vector of the portable autonomous device. In use, in order to initiate the displacement detection process, two sequential digital images of the surrounding area are captured. The two sequential digital images are used as the basis for calculation of the motion vector. In the subsequent step, at 3, the motion vector is output for use in an application. During the following step, as shown at 4, the following digital image now becomes the current digital image for calculating the motion vector of the portable autonomous device during the following iterative step, shown at 6. The displacement detection process is cyclic and may be used to output the real-time motion vector of a certain portable autonomous device at any given moment.

A more detailed description of the method for displacement detection according to a preferred embodiment of the present invention is as follows: During step 1, the computing unit receives a digital image that depicts a portion of the surrounding area and stores it as a current digital image. The digital image comprises a plurality of pixels, each pixel comprising representational information. Preferably, the representational information describes the local brightness and color of a related portion of the surrounding area within the digital image. Any one of a number of different types of color coordinates may be used to signify the representational information.

Properties of the aforementioned digital image may be enhanced in order to improve the quality of the motion estimation. Such enhancements may include the resizing of the frames and other possible modifications such as brightness and contrast enhancements, as described below.

An image sensor which is usually used to capture such images may capture the image in any known way but typically outputs a digital image in Red-Green-Blue (RGB) color coordinates. However, the image sensor which is used to capture such images may also output a digital image in YCbCr color coordinates, CIE L*a*b* (CIELAB) color coordinates, or any of a variety of other color coordinates, or just simply as gray levels.

Preferably, in order to reduce computational complexity of the motion vector detection, a grayscale digital image is used. Usually, each pixel of grayscale digital images has a single value. The gray level of each pixel of the face segment may be represented using one byte (0-255), the computational complexity of analyzing such a segment is lower than that of analyzing segments which are represented in RGB, HSV, CIELAB, YCbCr or any other color coordinates.

Preferably, in order to allow for a motion vector detection process using grayscale digital images, the method comprises a step of converting the color coordinates of the digital image, preferably RGB, to grayscale color coordinates. The converted color coordinates may also be represented by HSV, CIELAB, YCbCr or any other color coordinates. Preferably, a grayscale digital image is generated by using one of the channels that represent the color digital image as a reference. For example, in RGB color coordinates, the values of the R channel may be used for generating the grayscale digital image.

Preferably, if the original digital image is represented using RGB color coordinates; the values of pixels of the original digital image are converted to generate the grayscale digital image using the following equation:

$$GS = 0.3R + 0.59G + 0.11B$$

where GS denotes the new grayscale value of the related pixel, R denotes Red, G denotes Green, and B denotes Blue.

In order to improve the motion vector detection, the grayscale digital image may be further processed. Based upon accumulated knowledge, it is known that digital images, captured by some image sensors, do not accurately reflect the brightness level of the captured portion of the surrounding area. The margins of the captured digital image usually tend to represent a brightness level that is less than accurate for the related portion of the surrounding area. A displacement detection process which relies on such inaccurate representation of the illumination of the surrounding area is prone to miscalculation of the motion vector. In order to avoid the miscalculation of the motion vector, a brightness change compensation (BCC) mask may be used.

The BCC mask is used to convert the representational value of pixels of the grayscale digital image pixels. Each pixel is multiplied by a constant multiplicative factor whose value is determined according to the position of the multiplied pixel. Since the brightness level of pixels at the center of the grayscale digital image are preferably not intensified, pixels at the center are multiplied by a constant multiplicative factor which is approximately equal to one. Pixels at the corners of the grayscale digital image tend to suffer most from an undesired decrease in their brightness value. Therefore, pixels at the corners of the grayscale digital image are multiplied by a constant multiplicative factor with a value which is larger than one. Pixels from other areas of the grayscale digital image are multiplied by a constant multiplicative factor which is a derivative of their distance from the center of the grayscale digital image. Preferably, the value of each pixel is converted using the following set of equations:

$$CenterP=1$$

$$CornerP=1+C$$

$$MarP=1+C\cdot[(X-W/2)^2+(Y-H/2)^2]/[(W/2)^2+(H/2)^2]$$

where CenterP denotes the value of a constant multiplicative factor which is used for multiplying pixels at the center of the grayscale digital image, CornerP denotes the value of a constant multiplicative factor which is used for multiplying pixels at the corners of the grayscale digital image, and MarP denotes the value of a constant multiplicative factor which is used for multiplying pixels at other areas of the grayscale digital image. C denotes a constant factor; (X, Y) denotes the coordinates of the pixel at the grayscale digital image; and W and H denote the width and the height of the grayscale digital image, respectively. Preferably, C is equal to 0.41.

Preferably, in order to reduce the computational complexity of multiplying the pixels of the digital image and the BCC mask during the calculation of the motion vector, the constant multiplicative factor for each pixel is calculated beforehand and stored in a predefined matrix.

As depicted at step 2, the motion vector of the portable autonomous device is estimated. The estimation is calculated on the basis of two sequential grayscale digital images which are obtained. An earlier digital image is used as a reference frame and a later digital image is used as a sample frame.

Figure 2:
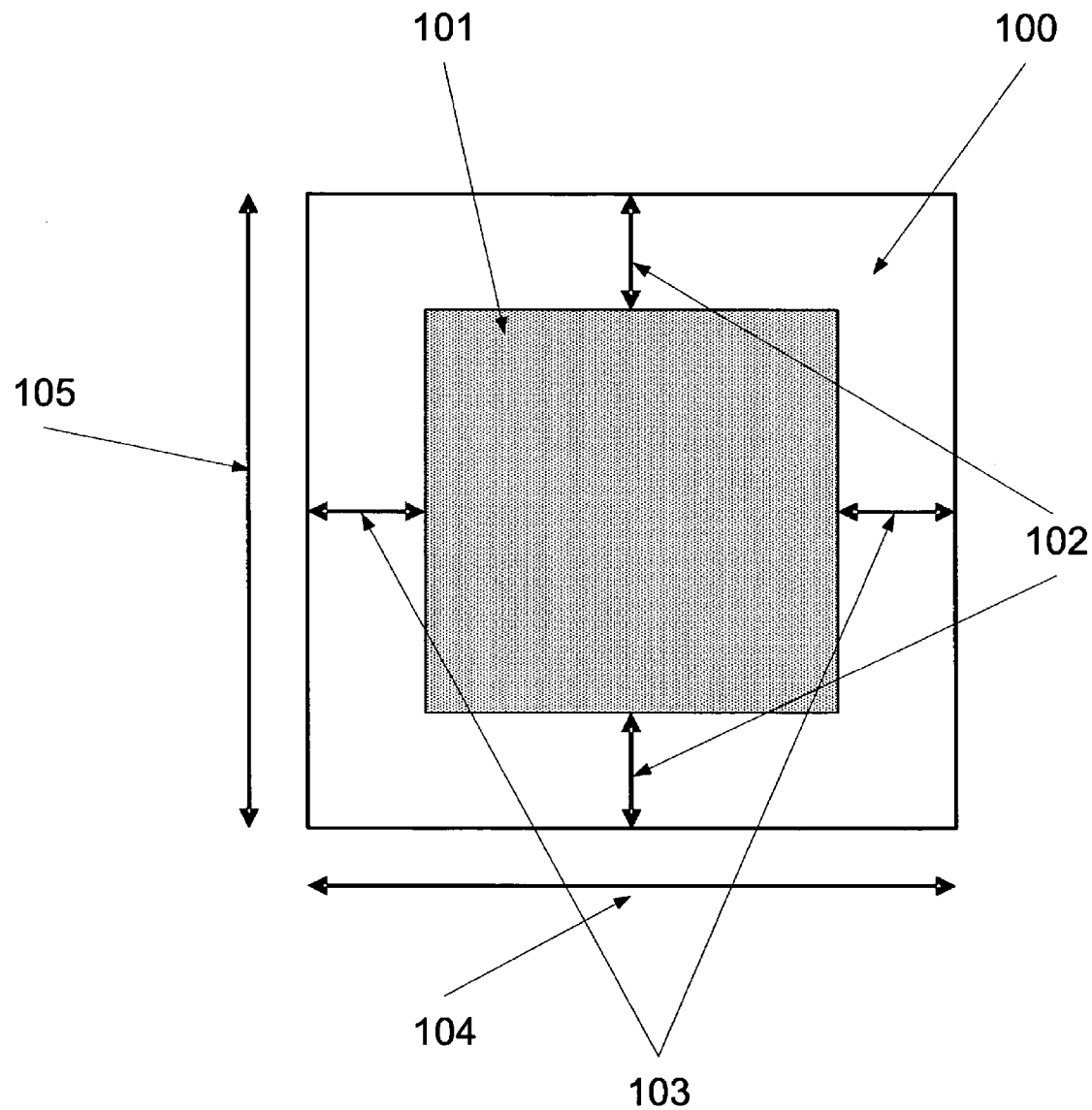
FIG. 2 is a reference frame and a quadrilateral reference area, according to one embodiment of the present invention.

Reference is now made to FIG. 2 which depicts a reference frame 100 and a quadrilateral reference area 101, according to an embodiment of the present invention. The motion vector of the portable autonomous device is calculated based on the differences between the position of a reference area within the reference frame and a matching area which is identified within the sample frame. The matching area is chosen according to correlation values which represent the similarity level between a reference area within the reference frame and matching area candidates within the sample frame. The position of each matching area candidate reflects a possible change in the position of the portable autonomous device. Based on the differences between the position of the reference area and the position of the matching area, a motion vector that represents the movement of the portable autonomous device is calculated, as described below. The motion vector may then be passed on for use by an application of the portable autonomous device. Accordingly, a user can maneuver the portable autonomous device in order to control different applications of the portable autonomous device.

In order to calculate the correlation values, a portion of the surrounding area which is represented by the reference area has to reappear in the sample frame. However, if the portion of the surrounding area which is captured by the reference frame is at the margins thereof 102, 103, the movement of the portable autonomous device may lead to that portion of the surrounding area being absent from the sample frame. Thus, the width of the margins defines the maximal shift between every two consecutive frames that can be detected. By using pixels from the quadrilateral reference area 101 one can ensure that they reappear in the following image, as long as the movement between the frames is not larger than the maximal shift.

In one embodiment of the present invention, a quadrilateral reference area 101 is defined in the center of the reference frame 100. Preferably, the quadrilateral reference area 101 is smaller than the reference frame 100 and is positioned in the center thereof. The quadrilateral reference area 101 is used as a reference area which is matched with matching area candidates from the sample frame. A portion of the surrounding area which is captured within the boundaries of quadrilateral reference area 101 has a higher probability of reappearing in the sample frame than does a portion of the surrounding area which is captured within the margins of reference frame 100. Preferably, the length of the quadrilateral reference area 101 is predefined. Preferably, the ratio of the length of the reference frame 104, 105 to the length of the margins 102, 103 is between 1:0.125 and 1:0.375. As described above, after a quadrilateral reference area 101 has been defined, a matching area having the same dimensions is determined within the boundaries of the sample frame.

Reference is now made to FIGS. 3A, 3B, 3C and 3D which depict a surrounding area which is partly captured and depicted by a reference frame 100 and by a sample frame 204. The reference frame 100 and the quadrilateral reference area 101 are similar to those shown in FIG. 2 above. However, FIGS. 3A-D further depicts a sample frame 204, a matching area candidate 202, and a set of captured objects according to a preferred embodiment of the present invention.

As shown at step 2 of FIG. 1, the current digital image and following digital images are used for calculating the motion vector of the portable autonomous device 501. Preferably, as depicted above, the chosen matching area candidate 202 which is captured in the current digital image depicts a portion of the surrounding area which is similar to the portion of the surrounding area which was captured in the previous digital image depicted by the quadrilateral reference area 101. The motion vector of the portable autonomous device is calculated based on a deviation between the position of the quadrilateral reference area 101 and the matching area candidate of the sample frame.

FIG. 3A depicts a reference frame 100 and a sample frame 204 which are captured by a portable autonomous device whose direction of movement is shown at numeral 503. FIG. 3B depicts the portion of the surrounding area which is captured in the reference frame 100. FIG. 3C depicts the portion of the surrounding area which is captured within the sample frame 204.

Both the reference frame 100 and the sample frame 204 originate from the same sequence of digital images. The frames have the same dimensions and can be referenced using the same coordinate system. Preferably, a coordinate system with an origin at the upper-left-hand corner of the frames is used.

As depicted in FIG. 3B and FIG. 3C the quadrilateral reference area 101 and the chosen matching area candidate 202 are positioned at different coordinates in relation to the origin of the coordinate system used. FIG. 3D depicts the deviation 504 between the position of the quadrilateral reference area 101 and the chosen matching area candidate 202. The deviation 504 reflects a motion vector which is opposite to the direction of movement of the portable autonomous device. Preferably, the deviation is represented as a set of two numbers (i.e., Mx, and My) that represent the difference between the coordinates of a certain pixel 505 that represents a certain portion of the surrounding area in the reference frame 100 and a corresponding pixel 506 that represents the same portion of the surrounding area in the sample frame 204.

Preferably, the motion vector calculated for the portable autonomous device is the inverse of the vector which represents the deviation between the reference area 101 and the chosen matching area candidate 202.

As shown at step 3 of FIG. 1, the motion vector is used in an application of the portable autonomous device. By using such a motion vector, a user may displace the portable autonomous device to generate directional instructions to one or more of the applications of the portable autonomous device. The displacement detection process uses the detected movement of the portable autonomous device to determine a motion vector which is interpreted as directional instructions. The directional instructions may be correlated to the displacement of a cursor image on a display screen associated with the portable autonomous device.

Preferably, the calculated motion vector of the portable autonomous device reflects the shifting of the portable autonomous device in a two dimensional plane which is parallel to the image sensor.

In one embodiment of the present invention, the output motion vector is a spatial motion vector that reflects the shifting of the portable autonomous device in a three dimensional space. In order to generate a spatial motion vector, at least two image sensors which are coupled to the portable autonomous device in an unparallel manner are used. Each one of the image sensors is used, as described above, to generate a linear motion vector that reflects the shifting of the portable autonomous device in a two dimensional plane. Since the linear motion vectors are positioned in different, nonparallel planes, the generated linear motion vectors differ one from another and respectively reflect the motion of the device in different, nonparallel planes. Preferably, the spatial motion vector of the device ((x', y', z') is determined by combining the two linear motion vectors ((x', y') and (x', z') that represent the motion of the portable autonomous device in two nonparallel planes. It should be noted that each of two linear motion vectors comprises information about the motion of the portable autonomous device along an axis (X, Y or Z). Therefore, a spatial motion vector that reflects the shifting of the portable autonomous device in a three dimensional space can be easily calculated. Preferably, the two image sensors are positioned on the surface of the portable autonomous device in a manner such that they are perpendicular to each other. The calculation of a spatial motion vector of an object based upon two motion vectors that reflect its movement in two different planes is generally well known and therefore is not described here in greater detail.

In one embodiment of the present invention the motion vector is multiplied by a sensitivity factor. The sensitivity factor is used to either intensify or to attenuate the influence of the motion of the portable autonomous device on the application.

Figure 4:
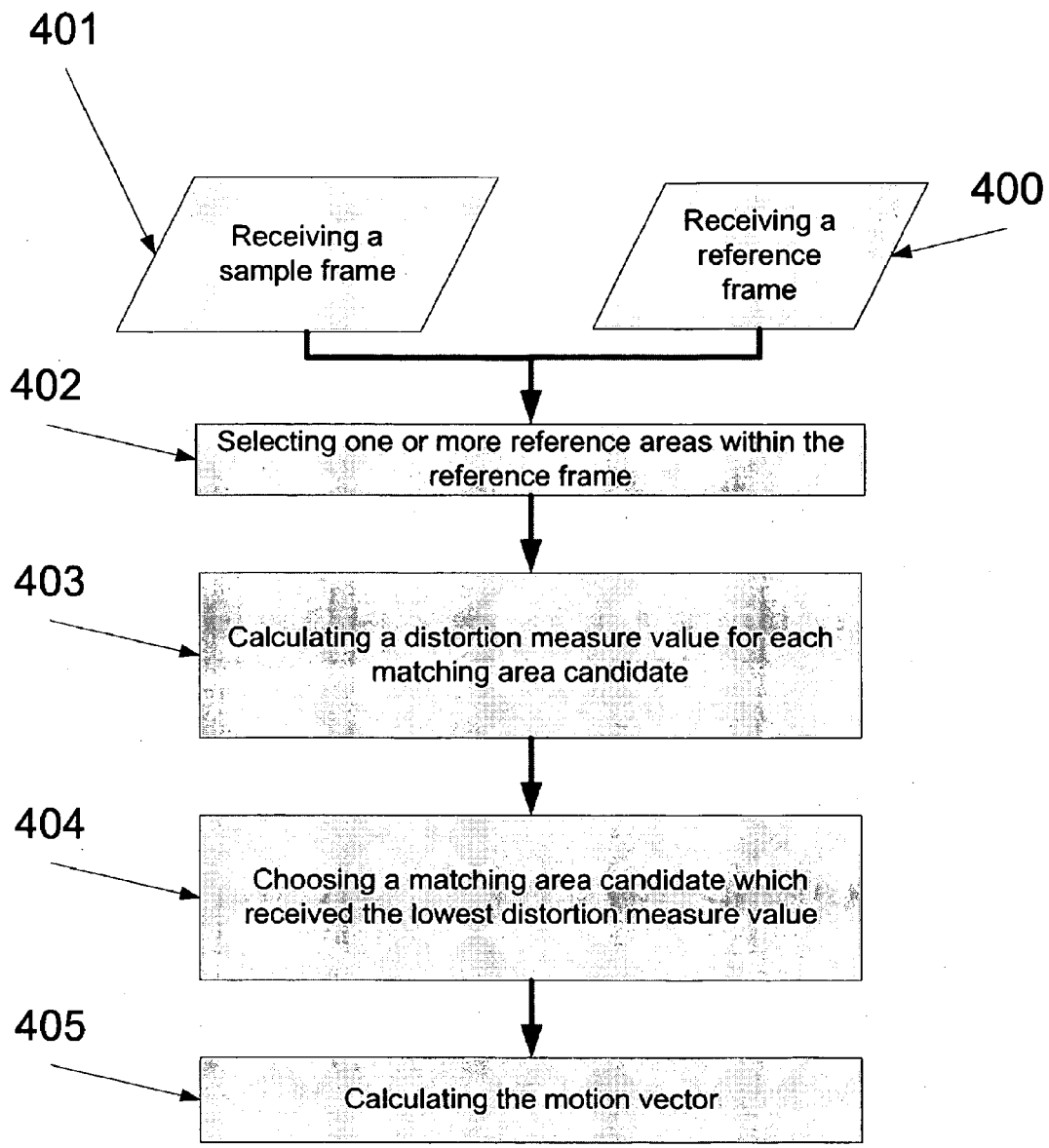
FIG. 4 is a simplified flowchart diagram of an exemplary block matching process, according to a preferred embodiment of the present invention.

Reference is now made to FIG. 4, which is a flowchart of an exemplary block matching process, according to a preferred embodiment of the present invention. As shown at step 3 of FIG. 1, the motion vector of the portable autonomous device is output for use in an application of the portable autonomous device. In order to calculate the motion vector, a matching area within the sample frame has to be identified.

In one embodiment of the present invention, a block matching process is used to choose a matching area within the sample frame. Preferably, a sum of absolute differences (SAD) process is used. The SAD process is used to quantify the similarity between the quadrilateral reference area 101 and different matching area candidates within the sample frame. The outcome of quantification is used to determine the matching area.

In FIG. 4, during the first step, as described above and shown at 400 and 401, a reference frame and a sample frame are received. Subsequently, as shown at 402, at least one reference area is defined within the boundaries of the reference frame. Preferably, the area is defined within the boundaries of the aforementioned quadrilateral reference area. Then, as shown at 403, the SAD process evaluates a distortion measure of the matching area candidates. The distortion measure reflects the level of similarity between the related matching area candidate and the reference area. Preferably, the algorithm of the SAD process which is used to evaluate the distortion measure between a certain matching area candidate and the reference area is defined according to the following equation:

$$SAD(B_{cur}, B_{ref}) = \sum_{j=1}^{Pl} \sum_{i=1}^{Pw} |B_{cur}(i, j) - B_{ref}(i, j)|$$

where $B_{ref}$ denotes the reference area, $B_{cur}$ denotes the matching area candidate, (i, j) denotes the coordinates of the matched pixel, and Pw and Pl respectively denote the number of pixels along the width and the length of the matched frames. During each iteration of the SAD process, a correlation value is determined by calculating the difference between the value of a pixel at the reference area $B_{cur}(i, j)$ and a respective pixel at the matching area candidate $B_{cur}(i, j)$. The outcome of the SAD process is a sum of the calculated correlation values of all the pixels.

The depicted algorithm is used to calculate the distortion measure value of all the matching area candidates. As shown at 404, only after each of the matching area candidates has been either evaluated using the SAD process or identified as not suitable as a matching area, as described below, is the matching area candidate with the lowest distortion measure chosen.

If L and W are the margin sizes (102, 103 in FIG. 2), a total of (2 L+1)·(2 W+1) different matching area candidates have to be evaluated. With regard to the size of the reference area, such a comprehensive matching process may have a high computational complexity that demands a substantial amount of computational resources. Such resources are not always available in portable autonomous devices such as mobile telephones and other handheld devices. In order to reduce the necessary amount of computational resources, the matching process has to be optimized. A few methods are available to allow optimization by early identification and removal of matching area candidates which are not suitable as matching areas.

In one embodiment of the present invention, the lowest distortion measure is stored as a current lowest distortion measure. This information may be used during the SAD process in order to reduce computational complexity. As described above, the distortion measure is a sum of the remainders of the subtraction between pixels of the reference frame ($B_{rer}$) and pixels of the matching area candidate ($B_{cur}$). The current lowest distortion measure may be used as a maximum threshold. During the SAD process, the sum of the remainders is compared with the current lowest distortion measure. If the sum exceeds the current lowest distortion measure, the SAD process stops and the related matching area candidate is identified as unsuitable. Clearly, if the current sum exceeds the current lowest distortion measure which has been calculated for a previous matching area candidate, the current matching area candidate cannot be chosen as having a higher distortion measure. The sum of the remainders may be matched with the current distortion measure in any stage of the SAD process in order to reduce its computational complexity.

Figure 5:
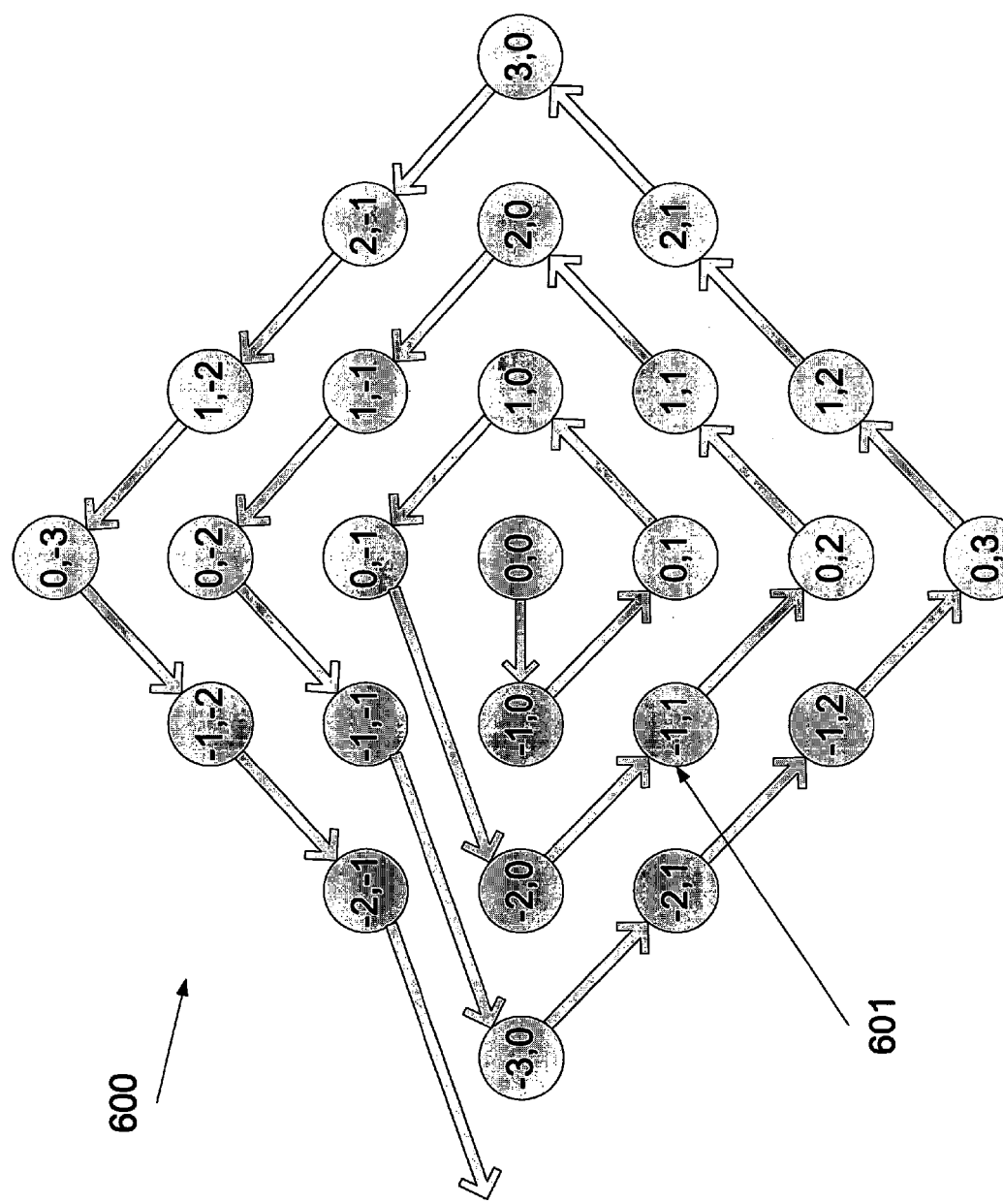
FIG. 5 depicts a helical search track for determining the order in which matching area candidates are matched, according to a preferred embodiment of the present invention.

Reference is now made to FIG. 5 which depicts a helical search track 600 for determining the order in which matching area candidates are matched, according to a preferred embodiment of the present invention. As described above, a total of (2 L+1)·(2 W+1) different matching area candidates have to be either evaluated using the SAD process or identified as unsuitable before a matching area is found. Clearly, identifying a matching area candidate as unsuitable before it is fully matched reduces the computational complexity of the SAD process. As described above, the early identification is based on information regarding the current lowest distortion measure. Thus, if the lowest distortion measure is identified at an early stage of the matching process, more matching area candidates may be identified as unsuitable before they are fully matched with the reference area.

In order to proceed with the identification of the matching area candidate with the lowest distortion measure, a helical search track 600 is used. It is assumed, based upon experimental data, that the matching area is usually positioned in the proximity of the reference area. Accordingly, in order to proceed with the identification of the matching area candidate, the adjacent matching area candidates are preferably matched before the nonadjacent matching area candidates are matched. Preferably, a helical search track 600 is used to determine the order in which the matching area candidates are to be matched with the reference area. Each node, for example, node 601, of the helical search track 600 comprises the deviation between the coordinates of the reference area and those of the matching area candidate. For example, if the coordinates of the upper left hand pixel of the reference area are (x, y), the coordinates of the upper left hand pixel of the matching area candidate which is matched sixth is (x−1, y−1), as shown at 601. Such a search track ensures that the closer matching area candidates are matched before the more distant matching area candidates are matched.

Reference is now made, once again, to FIG. 4. As shown at 405, the chosen matching area candidate is used for calculating the motion vector of the portable autonomous device, as discussed above. The motion vector detection process is cyclic and is configured to output the motion vector of the portable autonomous device at any given moment.

As described above, a given sample frame which is used during a certain iteration of the SAD process is used as the reference frame in the subsequent iteration of the SAD process.

Figure 6A:
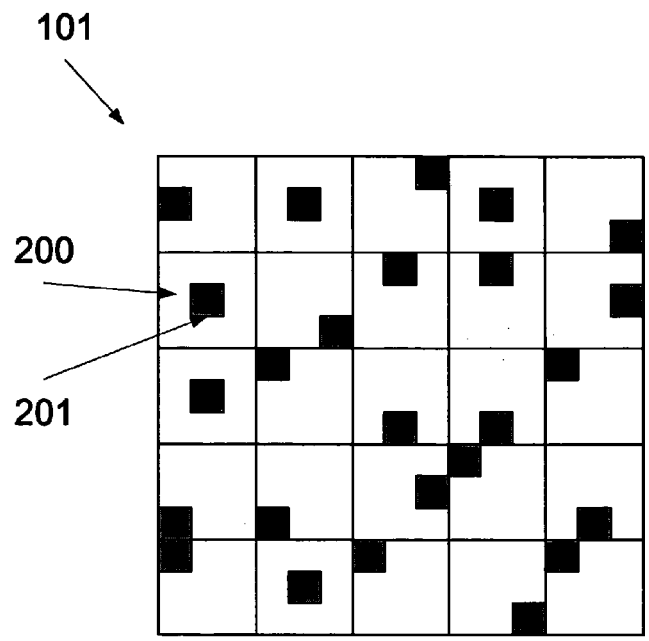
FIG. 6A is a reference frame having a quadrilateral reference area which is divided into regions having regional pivots.
Figure 6B:
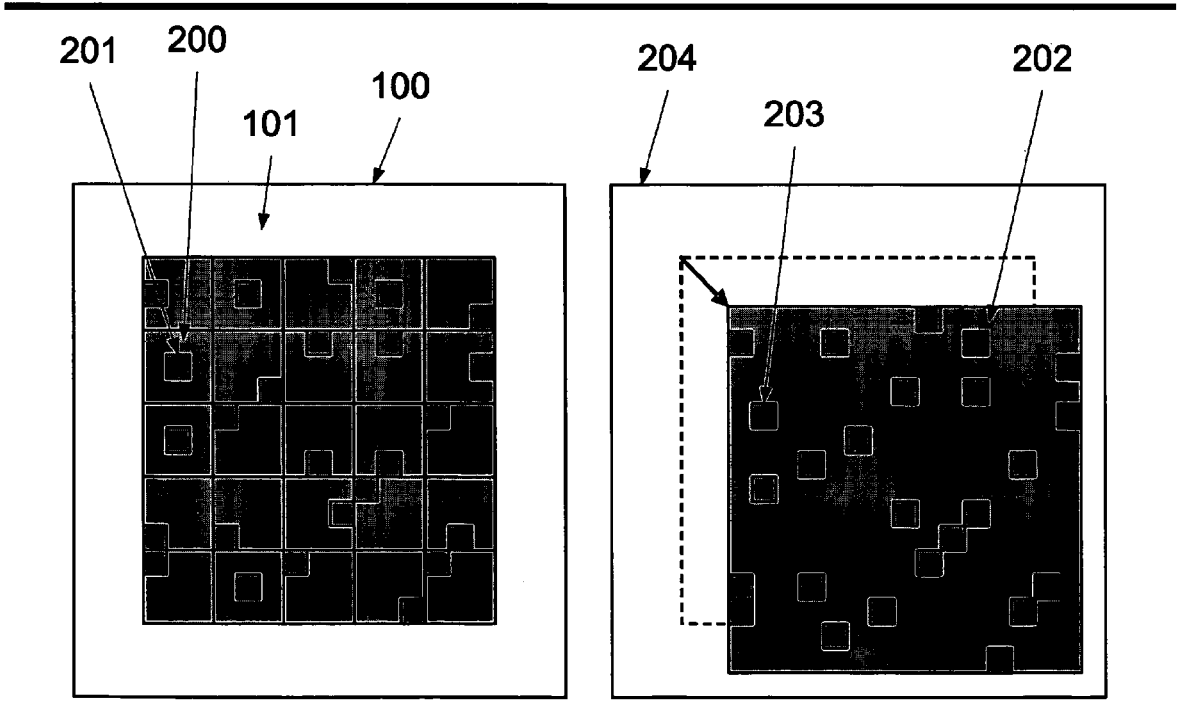
FIG. 6B is a reference frame having a quadrilateral reference area and a sample frame with an exemplary matching area candidate which has been generated in respect to the quadrilateral reference area, according to a preferred embodiment of the present invention.

Reference is now made to FIGS. 6A and 6B which depict a reference frame 100 having a quadrilateral reference area 101 which is divided into regions 200 having regional pivots 201 and an exemplary matching area candidate 202 of the sample frame 204 which is divided in a similar manner. The reference frame 100 and quadrilateral reference area 101 are similar to those shown in FIG. 2 above. However, FIGS. 6A-B further depicts regions 200 and pivots 201 according to a preferred embodiment of the present invention.

In one embodiment of the present invention, a regional pivot matching process is used to reduce the computational complexity of the SAD process. As shown at step 402 of FIG. 4, at least one reference area within the reference frame is chosen to be matched with a respective area in the sample frame. In order to reduce the high computational complexity of probing all the pixels of the matching area candidates, a set of pivots is chosen as a base for a comparison. Preferably, as depicted in FIG. 6A, the quadrilateral reference area 101 is divided into a number of regions. The number of regions is preferably a derivative of the frame size. Each region preferably has the same size and shape. A regional pivot 201 is selected within the boundaries of each region 200. Preferably, the regional pivot is 16 pixels (4 by 4) square. By using the regional pivot matching process only, the correlation values of pixels of the regional pivots are calculated and summed during the SAD process. It should be noted that reducing the region size increases the accuracy of the process result but also its computational complexity. Therefore, the size of the region may be determined with respect to the device's CPU usage and abilities.

FIG. 6B depicts the reference frame 100, the quadrilateral reference area 101, and a sample frame 204 with a matching area candidate 202 which has been generated in respect to the quadrilateral reference area 101. A set of regional pivots 203 is defined to cover only a limited area of the matching area candidate. By defining the regional pivots 201 and the set of regional pivots 203, the correlation values of related pixels may be calculated in a relatively short time. The reduction in the number of the matched pixels substantially decreases the computational complexity of the matching process.

Figure 7A:
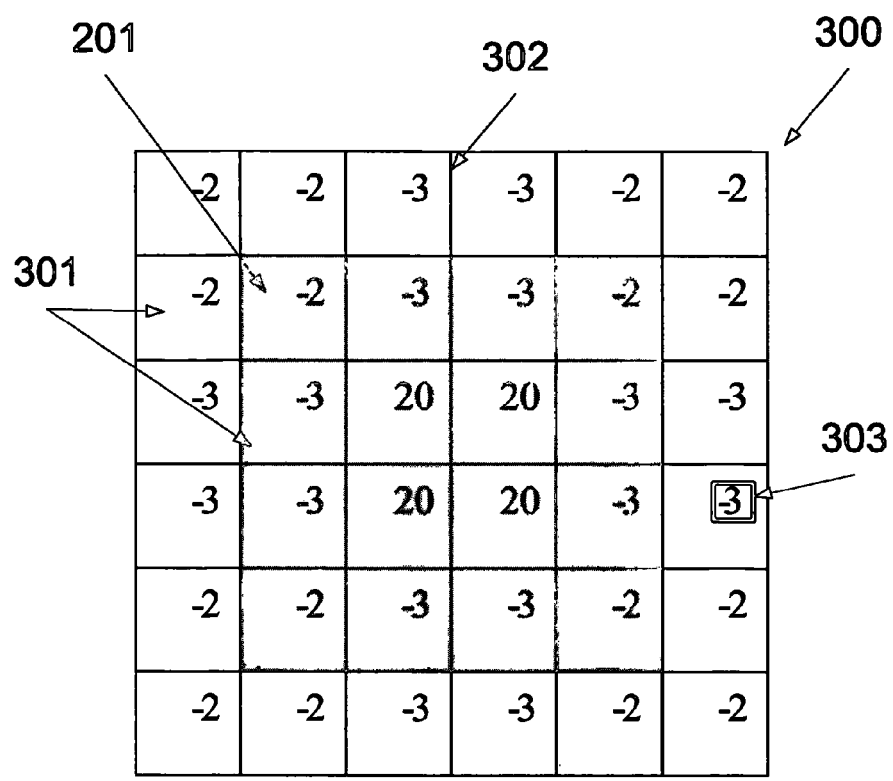
FIG. 7A is a mask which is configured to multiply values of pixels of a regional pivot and an encircling strip of pixels.
Figure 7B:
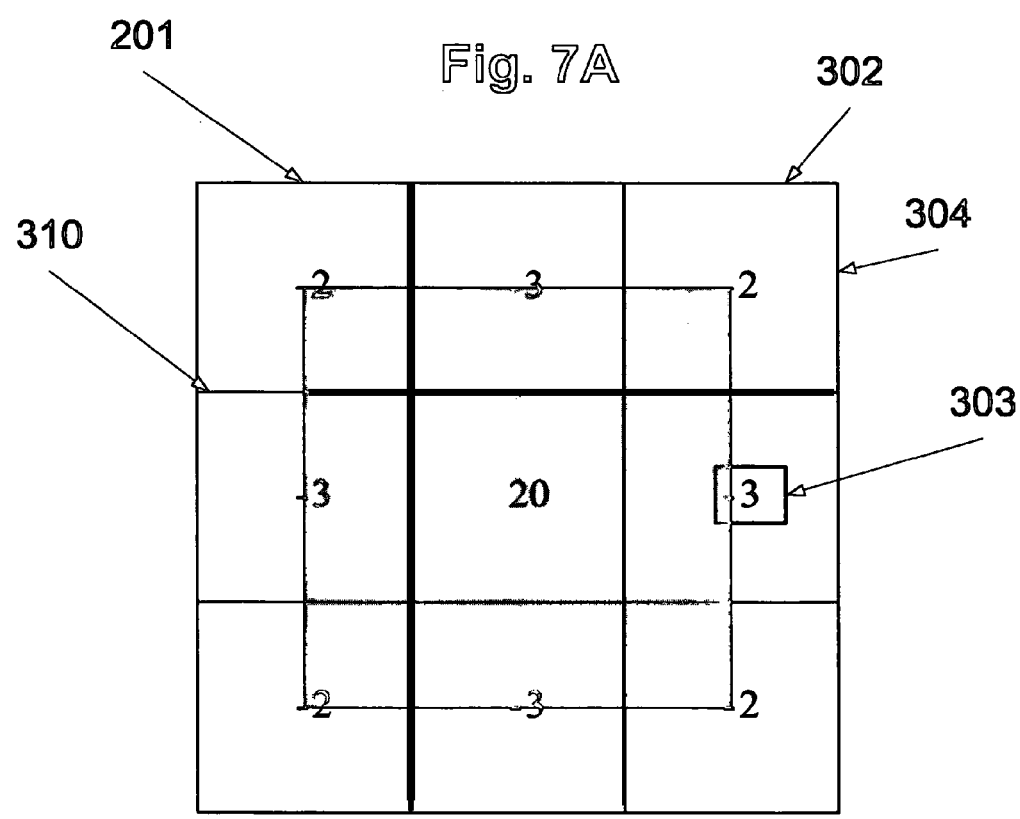
FIG. 7B is another mask which is configured to multiply values of pixels of a regional pivot and an encircling strip of pixels.

Reference is now made to FIGS. 7A and 7B which depict respective masks 300 and 310 which are configured to multiply values of pixels of a regional pivot 201 and an encircling strip of pixels 302. The regional pivot 201 is similar to that shown in FIG. 6A above. However, FIG. 7A further depicts squares 301 that represent constant factors according to a preferred embodiment of the present invention.

As described above, the regional pivot matching process substantially reduces the computational complexity of the SAD process. However, using regional pivots with a limited number of pixels may not always result in reliable outcomes.

For example, when the pixels of the regional pivot represent a portion of a digital image which depicts a uniform pattern, it comprises pixels with a certain value. If a portion that represents a uniform pattern covers pixels which are adjacent to the regional pivot, more than one matching area candidate may comprise pixels that represent the same uniform pattern. As described above, the outcome of the SAD process depends on the pattern of the matched block. Thus, when such matching area candidates are matched, the SAD process produces the same low distortion measure. Clearly, in this case, the SAD process cannot be used to identify a matching area, and the motion vector of the portable autonomous device cannot be calculated.

In order to assure the quality of the regional pivot matching process, a regional pivot selection process is performed. The regional pivot selection process is used to identify a regional pivot 201 which is positioned in a relativity nonuniform area of a certain region. By avoiding, as much as possible, choosing regional pivots from portions of the surrounding area that have uniform patterns, the regional pivot selection process increases the accuracy of the regional pivot matching process. Preferably the used mask is divided into 36 (6 by 6) equal squares 301. Each square 301 represents a different constant multiplicative factor 303. Each constant multiplicative factor 303 is used to multiply the value of a related pixel. Preferably, the constant multiplicative factors 303 at the center of the mask have positive values, while other constant multiplicative factors 303 have negative values. The sum of all the constant multiplicative factors is preferably zero.

During the pivot selection process, each regional pivot 201 is evaluated using the mask 300. The value of each of the pixels of the regional pivot 201 adjacent the center and of each of the pixels 302 which encircle the regional pivot is multiplied by a respective constant factor 303. The sum of all the products reflects, in an inverse proportion, the uniformity level of the pattern of the related portion of the surrounding area. The higher the absolute value of the sum, the lower will be the uniformity level.

If the pattern is uniform and the value of the pixels within the mask has an identical or similar value, the sum of the all products is zero or approximately zero. This outcome is achieved since, as described above, the sum of all the respective constant factors in the negative and the positive areas 303 is zero. The center of the mask and the margins of the mask have opposite values. Thus, if the values of the pixels within the mask are plotted in a nonuniform manner, the absolute value of the sum of all the products is relatively large. The larger the difference between the values of pixels at the positive center of the mask and the negative margins of the mask, the higher the absolute value of the sum of all the products. Preferably, the absolute value of the sum of all the products is stored as a pivot suitability rank that reflects the appropriateness of the probed potential regional pivot.

In use, the products of the values of pixels of each potential regional pivot are summed and the regional pivot that has the highest pivot suitability rank of all products is chosen as the regional pivot. Such an embodiment ensures that the selected regional pivot is positioned at an area that has a low uniformity level in relation to other potential regional pivots within the related region. In one embodiment of the present invention, the pivot's uniformity level is stored as a pivot suitability rank. Preferably, the suitability rank is stored in an inverse proportion to the uniformity level. Preferably, the pivot suitability ranks of the different chosen regional pivots may be used to determine the order of the regional pivot matching process. As shown at step 403 of FIG. 4, after the regional pivots have been chosen as reference areas in the reference frame, the distortion measure value for each matching area candidate is calculated. As described above, the current lowest distortion measure may be calculated and stored during the SAD process. In order to reduce computational complexity, the distortion measure value calculation may be halted during the calculation process. If the calculated distortion measure value exceeds the current lowest distortion measure, the calculation process may be halted and the distortion value of the next matching area candidate may be calculated. As described above, regional pivots with high suitability rank have a relatively nonuniform pattern. As such, regional pivots of matching area candidates which do not match with the reference area may have high correlation values. Thus, such regional pivots have a higher potential to influence the distortion measure value of the matching area candidate than do pivots with a low suitability rank. Thus, by summing the values of pivots with a high suitability rank before pivots with a low suitability rank, unsuitable matching area candidates are presumably identified in a relativity short time. Accordingly, in one embodiment of the present invention, the order of addition of regional pivots is determined according to the regional pivot suitability rank. The regional pivots are placed in descending order according to their suitability rank, and the correlation values of their pixels are added to the sum.

As described above, during the regional pivot selection process, the value of each pixel of each potential regional pivot is multiplied by a respective value of the mask before it is added to the sum.

FIG. 7B depicts a mask 310, according to one embodiment of the present invention, which is used in order to reduce the computational complexity of the regional pivot selection process. By using such a mask, the values of pixels of the reference area are added to a temporary sum before they are multiplied by values of the mask. The outcomes of the temporary sums are added to the distortion measure sum. As depicted in FIG. 7B, the mask 310 is divided into groups 304 of pixels, preferably four. Pixels in each group are multiplied by the same constant multiplicative factor 303. Preferably, the pixels of each group are arranged in a square like group 304. All the pixels in each group are summed and only that number is multiplied by a related constant multiplicative factor 303. The temporary sums are then summed to reflect the uniformity level of the mask, as described above. Clearly, such an embodiment reduces the number of mathematical operations by cutting down the number of pixel multiplications.

Reference is now made, once again, to FIG. 4. After the set of regional pivots has been chosen and defined at the matching area at step 402, the distortion measure value for each matching area candidate may be calculated, as shown at step 403. Since the matched area is limited, the computational complexity of the distortion measure value calculation is relatively low. The matching area candidate with the lowest distortion measure value is easily chosen, at step 404, and the motion vector is calculated, at step 405.

The reliability of output motion vectors is not constant. As described above, a relatively unreliable output may be produced when the captured surrounding areas have a uniform pattern. The regional pivot selection process cannot completely achieve the effect of uniform patterns on the quality of the displacement detection process. For example, if a uniform pattern completely covers one or more regions, the values of pixels of any regional pivot of the region are summed to approximately the same undesirable outcome. Matching between matching area candidates and a reference area which comprises pixels that depict the same uniform surface cannot provide the needed information for generating a reliable motion vector.

In one embodiment of the present invention, for each output motion vector, a quality level is calculated. The quality level is based upon the distortion measure of each surface of the matching area candidates. When the reference and sample frames depict a relatively large portion of a nonuniform surface, the distortion measures of most of the matching area candidates is high. As described above, the quality level is an outcome of high correlation values which are calculated during the SAD process. However, when the captured images depict relatively large uniform surfaces, the distortion measures of most of the matching area candidates are relatively low. Preferably, the quality level of a certain motion vector is a sum of all the distortion measures of related matching area candidates. The higher the sum, the higher will be the motion vector's quality level.

Evaluating the quality level of the motion vector may be substantially beneficial for some applications. For example, one or more thresholds may be predefined in order to determine, during the displacement detection process, whether to use or to ignore the generated motion vector. In another embodiment, the quality level may be used to determine whether or not to inform the operator of the portable autonomous device as to the reliability of the motion vector. Preferably, a voice or a visual message indicating the quality level of the motion vector is presented to the operator. An example for the visual message may be a blinking display or a text message.

Another use for the quality of level of the motion vector is based on the assumption that usually each movement of the portable autonomous device is represented by a series of similar and sequential motion vectors. Thus, it is assumed that the probability that the current motion vector of the portable autonomous device is identical to the previous motion vector is high. Preferably, a quality level reduction instructs the portable autonomous device to use a previous motion vector as the current motion vector. Preferably, motion vectors are stored for one or more iteration. If the quality level decreases below a predefined threshold, a previously calculated motion vector is output as the current motion vector. Such an embodiment may be beneficial in order to overcome only short miscalculations, preferably of a few deciseconds long, which are caused by analyzing a sequence of digital images which depict uniform surfaces.

Figure 8:
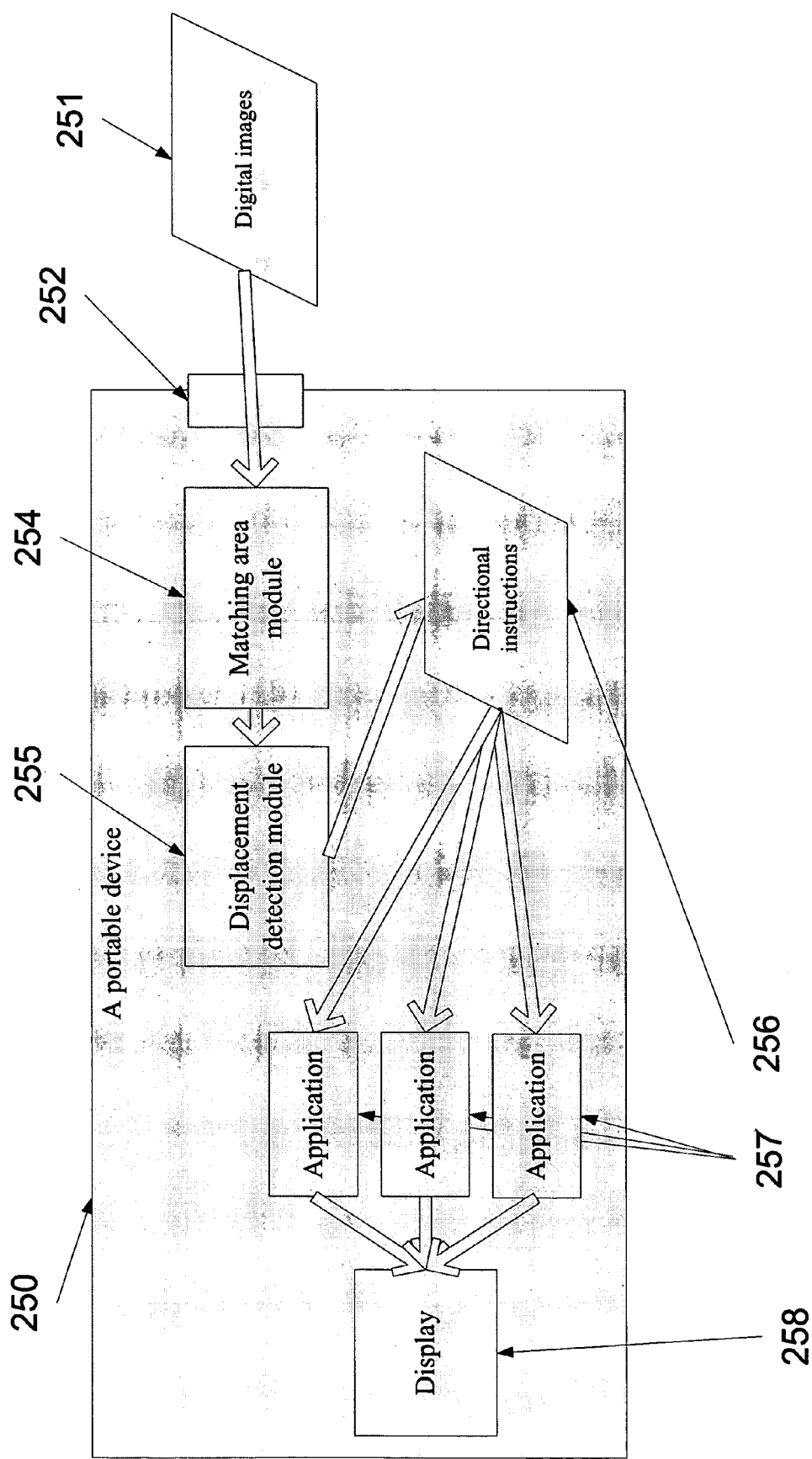
FIG. 8 is a schematic illustration of a portable autonomous device having an image sensor for enabling users to input directional instructions, according to a preferred embodiment of present invention.

Reference is now made to FIG. 8 which depicts a portable autonomous device with a displacement detection module, according to a preferred embodiment of the present invention. The portable autonomous device 250 is adapted to receive in real time digital images 251 from an image sensor via a designated image input module 252. The received digital images 251 originate from an image sensor, which may be a complementary metal oxide semiconductor (CMOS) sensor or a charged coupled portable autonomous device (CCD) sensor.

The digital image is transferred to a matching area module 254 which is used to choose the position of the reference area within the boundaries of the reference frame typically a current digital image. The matching area module 254 delimits the area which is matched with the reference area. The delimitation allows a faster analysis of the reference area and reduces the computational complexity of the displacement detection process. Then, the matching area module 254 is used to identify a matching area within the boundaries of a later frame, the later frame being an additional digital image that is received in a later point in time. The positions of the matching area and the reference area are transferred to a displacement detection module 255. The displacement detection module 255 is used to generate the current motion vector of the portable autonomous device based upon the positions of the reference area and the matching area. Based upon the motion vector, the directional instructions 256 are output to one or more of the applications 257 of the portable autonomous device 250. A display 258 is used to inform the user regarding the calculated motion vector, according to the different application outputs.

Figure 9:
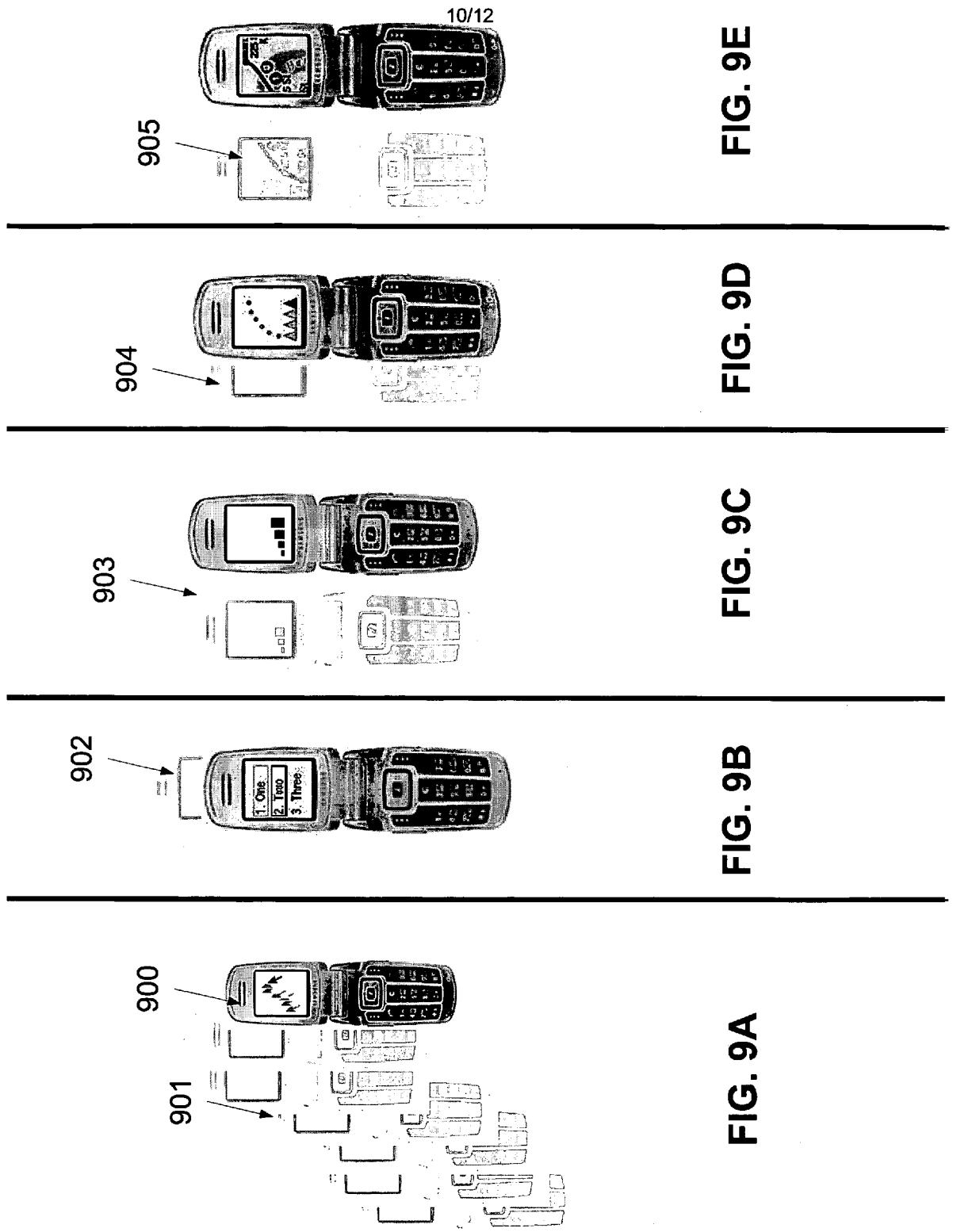
FIG. 9A is an exemplary schematic illustration of the displacement of a mobile phone which is used to input control signals in order to control a displayed cursor.
FIG. 9B is a schematic illustration of the displacement of a mobile phone which is used to navigate through displayed menus.
FIG. 9C is a schematic illustration of the displacement of a mobile phone which is used to enhance its volume level.
FIG. 9D is a schematic illustration of the displacement of a mobile phone which is used to control a game application.
FIG. 9E is a schematic illustration of the displacement of a mobile phone which is used to control a navigation application.

Reference is now made to FIGS. 9A, 9B, 9C, and 9D which depict schematic illustrations of mobile phones which use the displacement detection process for different kind of applications. As shown at step 3 of FIG. 1, during every cycle of the displacement detection process, a motion vector is output based upon the displacement of the device. FIG. 9A depicts one embodiment of the present invention that comprises a cursor control module, stored on the portable autonomous device, which may be operated when motion vectors are received. The user may simply physically displace the portable autonomous device 900 to cause the cursor displacement to be recognized thereby. A displacement of the mobile phone is shown at numeral 901. The portable autonomous device 900 displacement may be done on any chosen two-dimensional plane.

FIGS. 9B and 9C depict embodiments of the present invention in which the motion vectors are converted to control signals which allow a user to control common visual interfaces of the portable autonomous device. For example, motion vectors may be used by users to navigate through toolbars, dialog boxes, windows, and hierarchical menus in which some of the options open into sub-menus. The users can thus use the displacement detection process as an interface for managing contact information, voice mail, and hardware settings, for browsing the Web and for connecting to specialized information services. In mobile phones, for example, the output motion vectors may be further used for dialing and data entry and for navigating through hierarchical menus that provide access to most functions.

For example, as shown in FIG. 9B, vertically moving the mobile phone 902 allows a user to navigate through a menu. The direction of the motion vectors parallel to the vertical axis is converted to navigational instructions that reflect the user selection.

In another example, as shown in FIG. 9C, horizontally moving the mobile phone 903 allows a user to adjust the volume level of the speakers of the mobile phone. The horizontal movement of the mobile phone 903 determines motion vectors parallel to the horizontal axis, which are converted to navigational instructions that reflect the user selection.

FIGS. 9D and 9E depict embodiments of the present invention in which the motion vectors are converted to control signals which allow a user to control different applications of portable autonomous devices. FIG. 9D depicts horizontal movement of the mobile phone 904 by which a user may operate games thereon. FIG. 9E depicts horizontal movement of the mobile phone 905 by which a user may operate navigation software modules thereon. The advancement of the motion vector is converted to directional instructions which control graphic objects on the display or other operational instructions.

Figure 10:
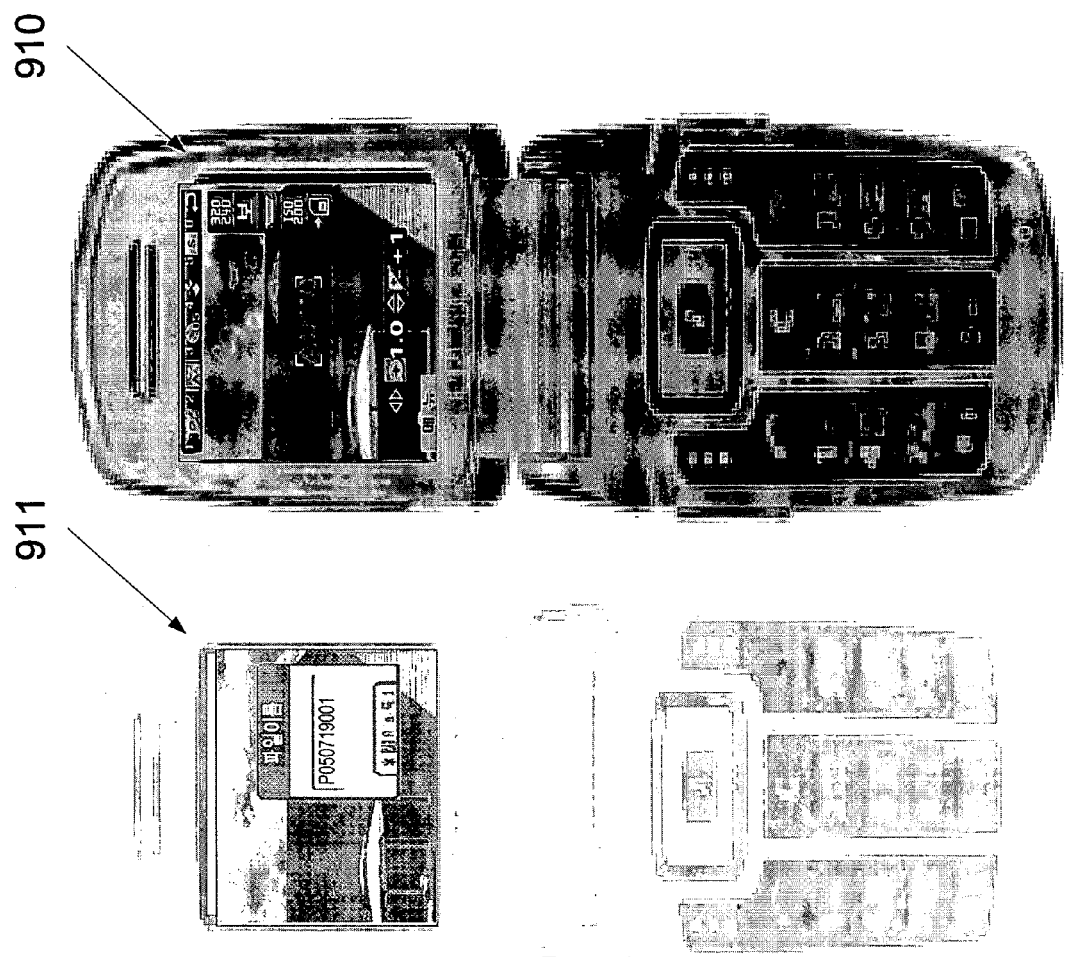
FIG. 10 is an exemplary schematic illustration of the displacement of a mobile phone which is used to input control signals in order to control a snapshot module, in accordance with preferred embodiments of the present invention.

Reference is now made to FIG. 10, which depicts schematic illustrations of mobile phones which use the displacement detection process for taking snapshots. As noted above, during every cycle of the displacement detection process, a motion vector is outputted based upon the displacement of the device. As commonly known, mobile devices that comprise image sensors are usually configured for taking snapshots. However, since the user's hand may tremble during the snapshot taking process, the picture taken may be blurry since the mobile device may have trembled.

In order to solve the above problem, FIG. 10 depicts an embodiment of the present invention that comprises a snapshot module, stored on the portable autonomous device, which may be used for taking snapshots when motion vectors are received. In use, the user may simply physically place the portable autonomous device 910 to capture a digital image that depicts certain scenery he desires to photograph. Then, as in other known integrated image sensor devices, the user presses a designated button for capturing a snapshot of the scenery. Now, in one embodiment of the present invention, the snapshot module is configured to detect any displacement of the mobile device, as shown at numeral 911. The detection is made when the calculated motion vector reflects a certain displacement or tilting. The displacement may be in any direction, on any chosen two-dimensional plane. In one embodiment of the present invention, if no motion displacement is detected for a predefined period, such as a second, the snapshot is taken automatically. This allows a panning-type camera motion and a pause by the photographer on a selected target which facilitates the shot being taken.

Figure 11:
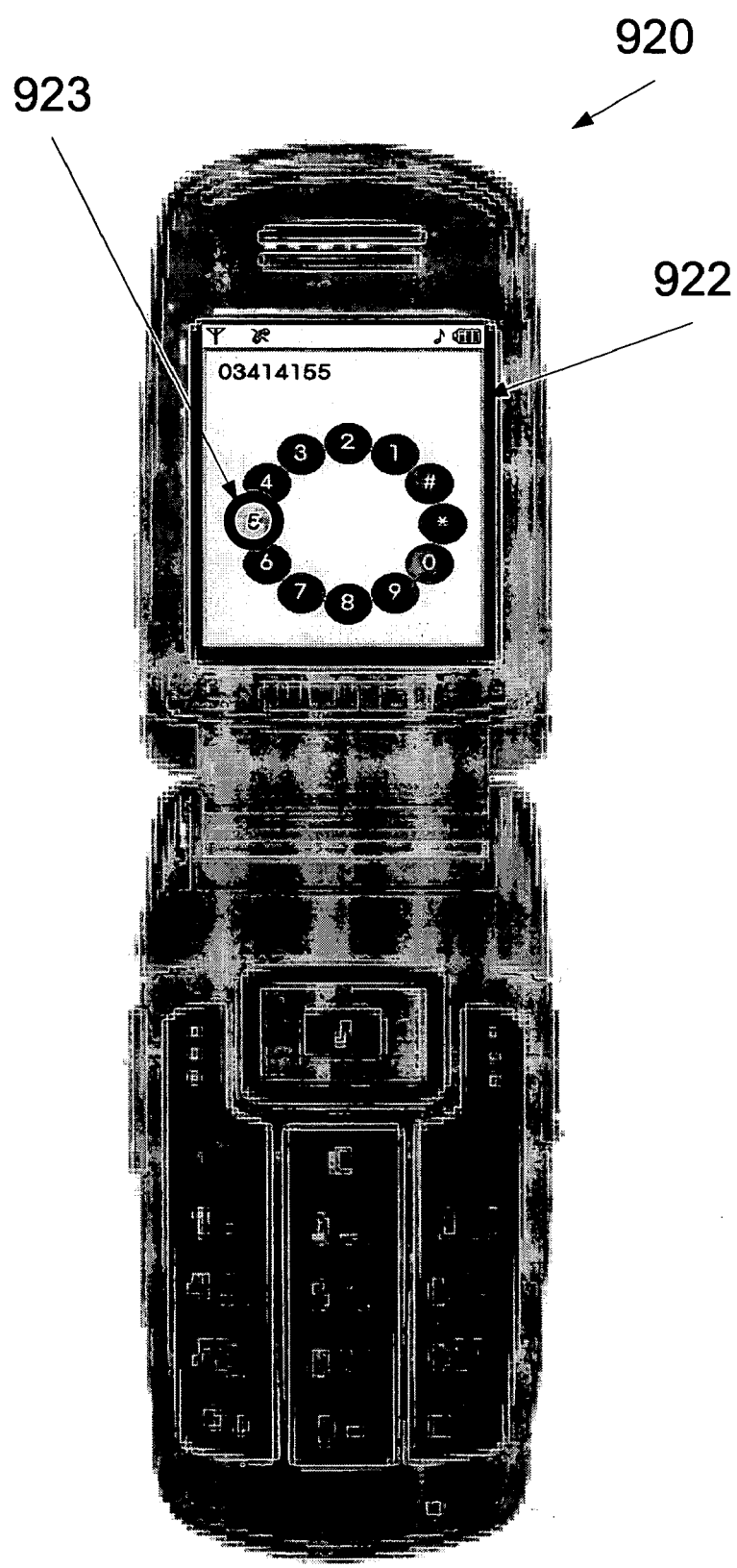
FIG. 11 is an exemplary schematic illustration of the displacement of a mobile phone which is used to input control signals in order to control a dialing module, in accordance with a preferred embodiment of the present invention.

Reference is now made to FIG. 11, which depicts schematic illustrations of mobile phones which use the displacement detection process for controlling a dialing module. As noted above, during every cycle of the displacement detection process, a motion vector is output based upon the displacement of the device. FIG. 11 depicts one embodiment of the present invention that comprises a dialing module, stored on the portable autonomous device, which may be operated when motion vectors are received. The dialing module is preferably configured to generate a display of a dial 922 and a digit marker 923. The user may simply physically displace the portable autonomous device 920 to cause the displacement of a digit marker 923 to move between different numbers on the dial. Preferably, the dialing module is configured to control the displacement of a digit marker 923 by converting the tilt movements of the device into displacement instructions. The portable autonomous device 920 may be tilted to any angle. The user may add a certain digit to the number to be dialed, for example by pressing a designated button when the digit marker 923 points on a representation of the certain digit in the dial display 922.

It is expected that during the life of this patent many relevant portable autonomous devices and systems will be developed and the scope of the terms herein, particularly of the terms digital image, image sensor, processing, computing unit, and grayscale image are intended to include all such new technologies a priori.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A displacement detection method for a portable autonomous device having an integrated image sensor, said method comprising:
   a) receiving a current digital image from said image sensor, said current digital image depicting a background scene;
   b) choosing the position of a first area within said current digital image;
   c) receiving a later digital image from said image sensor depicting an overlapping portion of said background scene;
   d) identifying the position of a second area matching said first area within said later digital image, said matching being such that said first and second areas depict the same portion of said background scene; and
   e) calculating a said current motion vector of said portable autonomous device according to a displacement between said first area and said second area, wherein said identifying of step (d) is performed according to the following steps:
      i) separately evaluating a distortion measure of each one of a plurality of area candidates according to differences in representational information from said first area;
      ii) evaluating a quality level of said motion vector, said quality level determined according to said distortion measures; and
      iii) choosing one of said area candidates as a matching area, said chosen matching area candidate having the lowest distortion measure; and
   further comprising a step of storing said motion vector as a previous motion vector, wherein said calculating of step (e) is performed according to the following steps:
      i) if said current quality level does not exceed a predefined threshold, substituting said previous motion vector as the outcome; and
      ii) if said current quality level does exceed said predefined threshold, calculating said current motion vector.

2. The displacement detection method of claim 1, further comprising a step of indicating said current quality level of said motion vector.

3. The displacement detection method of claim 1, wherein said evaluating of step (i) is halted if the current distortion measure is higher than a previously calculated distortion measure.

4. The displacement detection method of claim 1, wherein said first area comprises a plurality of regions.

5. A displacement detection method for a portable autonomous device having an integrated image sensor, said method comprising:
   a) receiving a current digital image from said image sensor, said current digital image depicting a background scene;
   b) choosing the position of a first area within said current digital image;
   c) receiving a later digital image from said image sensor depicting an overlapping portion of said background scene;
   d) identifying the position of a second area matching said first area within said later digital image, said matching being such that said first and second areas depict the same portion of said background scene; and
   e) calculating a said current motion vector of said portable autonomous device according to a displacement between said first area and said second area, wherein said identifying of step (d) is performed according to the following steps:
      i) separately evaluating a distortion measure of each one of a plurality of area candidates according to differences in representational information from said first area;
      ii) evaluating a quality level of said motion vector, said quality level determined according to said distortion measures; and
      iii) choosing one of said area candidates as a matching area, said chosen matching area candidate having the lowest distortion measure, wherein said first area comprises a plurality of regions, and during said choosing of step (ii) said regions are probed in a certain order, said certain order determined according to said differences in representational information of pixels of each one of said regions.

6. A displacement detection method for a portable autonomous device having an integrated image sensor, said method comprising:
- a) receiving a current digital image from said image sensor, said current digital image depicting a background scene;
- b) choosing the position of a first area within said current digital image;
- c) receiving a later digital image from said image sensor depicting an overlapping portion of said background scene;
- d) identifying the position of a second area matching said first area within said later digital image, said matching being such that said first and second areas depict the same portion of said background scene; and
- e) calculating a said current motion vector of said portable autonomous device according to a displacement between said first area and said second area, wherein said choosing of step (b) is performed according to the following steps:
- i) dividing a portion within said current digital image into a plurality of regions;
- ii) separately identifying a regional pivot within each one of said plurality of regions; and
- iii) choosing said regional pivots as said first area; and wherein said identifying of step ii) is performed according to the following steps:
  - a) for each region of said plurality of regions, separately evaluating a uniformity level for each one of a plurality of potential regional pivots, said uniformity level reflecting the variety of representational information of related pixels; and
  - b) for each region of said plurality of regions, separately choosing one of said potential regional pivots having the lowest uniformity level.

7. The displacement detection method of claim 6, wherein said evaluating is performed by multiplying said representational information of pixels of said related regional pivot and an encircling strip of pixels by a constant multiplicative factor of a set of constant multiplicative factors and summing the products, whereby said uniformity level may be determined according to the proximity of the sum of the values of all the products to zero.

8. The displacement detection method of claim 1, further comprising a step (e1) between step (e) and (f) of storing said later digital image as a first current digital image.

9. The displacement detection method of claim 1, wherein said current and later digital images are captured during the tilting of said portable autonomous device.

10. The displacement detection method of claim 1, further comprising a step of using said motion vector as an indication for taking a snapshot.

* * * * *